United States Patent
Lian et al.

(10) Patent No.: US 11,720,837 B2
(45) Date of Patent: Aug. 8, 2023

(54) SYSTEMS AND METHODS FOR DRIVER SCHEDULING

(71) Applicant: Walmart Apollo, LLC, Bentonville, AR (US)

(72) Inventors: Kunlei Lian, Bentonville, AR (US); Ming Ni, Bentonville, AR (US); Mingang Fu, Palo Alto, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 17/163,469

(22) Filed: Jan. 31, 2021

(65) Prior Publication Data

US 2022/0245564 A1    Aug. 4, 2022

(51) Int. Cl.
*G06Q 10/0631* (2023.01)
*G06Q 10/04* (2023.01)
(Continued)

(52) U.S. Cl.
CPC . *G06Q 10/063116* (2013.01); *G01C 21/3461* (2013.01); *G05B 13/041* (2013.01);
(Continued)

(58) Field of Classification Search
CPC combination set(s) only.
See application file for complete search history.

(56) References Cited

U.S. PATENT DOCUMENTS 5,880,958 A * 3/1999 Helms ............... G08G 1/202
340/991
10,747,213 B2 * 8/2020 Ryu ................ G06Q 10/06313
(Continued)

FOREIGN PATENT DOCUMENTS

CA    2842842 A1 * 1/2013    ......... G01C 21/3469
CA    3073155 A1 * 8/2020    ..... G06Q 10/063114

OTHER PUBLICATIONS

N. A. C. M. Keerthisinghe et al. "Optimization of Truck and Driver Scheduling Using Simulated Annealing," 2018 IEEE International Conference on Service Operations and Logistics, and Informatics (SOLI), 2018, pp. 91-96, doi: 10.1109/SOLI.2018.8476766. (Year: 2018).*

(Continued)

*Primary Examiner* — Crystol Stewart
(74) *Attorney, Agent, or Firm* — Bryan Cave Leighton Paisner LLP

(57) ABSTRACT

Systems and methods including one or more processors and one or more non-transitory storage devices storing computing instructions configured to run on the one or more processors and perform: receiving a request to generate one or more schedules for one or more drivers; determining one or more respective day cab schedules for each respective day cab driver of the one or more drivers; assigning one or more permanent drivers of the one or more drivers to one or more permanent tractors; assigning at least one driver of one or more remaining drivers of the one or more drivers to at least one tractor using a first set of rules; generating the one or more schedules for the one or more drivers; and coordinating displaying the one or more schedules for the one or more drivers on an electronic device of a user. Other embodiments are disclosed herein.

20 Claims, 8 Drawing Sheets

(51) Int. Cl.
*G05B 13/04* (2006.01)
*G06Q 10/0835* (2023.01)
*G01C 21/34* (2006.01)

(52) U.S. Cl.
CPC ......... *G06Q 10/04* (2013.01); *G06Q 10/0631* (2013.01); *G06Q 10/06312* (2013.01); *G06Q 10/063114* (2013.01); *G06Q 10/063118* (2013.01); *G06Q 10/0835* (2013.01)

(56) References Cited

U.S. PATENT DOCUMENTS

| | | |
|---|---|---|
| 2007/0001831 A1 | 1/2007 | Raz et al. |
| 2009/0204460 A1 | 8/2009 | Jain et al. |
| 2009/0204461 A1* | 8/2009 | Jain ................ G06Q 10/063118 705/7.13 |
| 2010/0094688 A1* | 4/2010 | Olsen, III .............. G06Q 10/04 705/7.42 |
| 2012/0310691 A1 | 12/2012 | Carlsson et al. |
| 2013/0021174 A1* | 1/2013 | Silzer, Sr. ............. G05D 1/0297 340/989 |
| 2013/0111389 A1* | 5/2013 | Aydin .............. G06Q 10/06375 715/772 |
| 2013/0191836 A1* | 7/2013 | Meyer ................... G06F 9/4881 718/103 |
| 2015/0161564 A1 | 6/2015 | Sweeney et al. |
| 2015/0178649 A1* | 6/2015 | Furman ........... G06Q 10/06312 705/7.22 |
| 2016/0109251 A1 | 4/2016 | Thakur |
| 2019/0095859 A1* | 3/2019 | Pike .................... G06Q 10/0834 |
| 2019/0196502 A1* | 6/2019 | Arena ............. G08G 1/096741 |
| 2019/0197475 A1* | 6/2019 | Bianconcini ..... G06Q 10/08355 |
| 2019/0295204 A1* | 9/2019 | Putcha ........... G06Q 10/063116 |
| 2019/0318629 A1* | 10/2019 | Ran ........................ G08G 1/202 |
| 2020/0209840 A1* | 7/2020 | Ryu .................... G05B 13/0265 |
| 2021/0029488 A1* | 1/2021 | Kaneichi .......... G08G 1/096811 |

OTHER PUBLICATIONS

E. C. Ervin and R. C. Harris, "Simulation analysis of truck driver scheduling rules," Proceedings of the 2004 Winter Simulation Conference, 2004., 2004, pp. 1861-1869 vol. 2, doi: 10.1109/WSC.2004.1371541. (Year: 2004).*

J. Sauer and H. . -J. Appelrath, "Integrating transportation in a multi-site scheduling environment," Proceedings of the 33rd Annual Hawaii International Conference on System Sciences, Maui, HI, USA, 2000, pp. 9 pp. vol. 2-, doi: 10.1109/HICSS.2000.926670. (Year: 2000).*

* cited by examiner

SYSTEMS AND METHODS FOR DRIVER SCHEDULING

TECHNICAL FIELD

This disclosure relates generally to optimization algorithms and more specifically to optimization algorithms applied to a scheduling problem.

BACKGROUND

In the past, assigning drivers to vehicles in a vehicle fleet has been cumbersome and slow. Previously, drivers would request a schedule when they are available and an administrator would create a schedule from scratch. This was true even when computer assisted scheduling was available because many previous scheduling algorithms can take hours or even days to optimize schedules for a vehicle fleet and its associated drivers. This long computation time for schedule optimizations provided several problems. Many times, a resulting optimized schedule became obsolete before the optimization process can be completed. For example, a driver may become absent due to sickness or a tractor can become unavailable due to repairs during an optimization process. This problem with "stale" schedules can be further complicated when an optimization is performed on a mobile device with a less powerful processor. Therefore, there is a need for an improved system and method for driver scheduling.

BRIEF DESCRIPTION OF THE DRAWINGS

To facilitate further description of the embodiments, the following drawings are provided in which.

Figure 1:
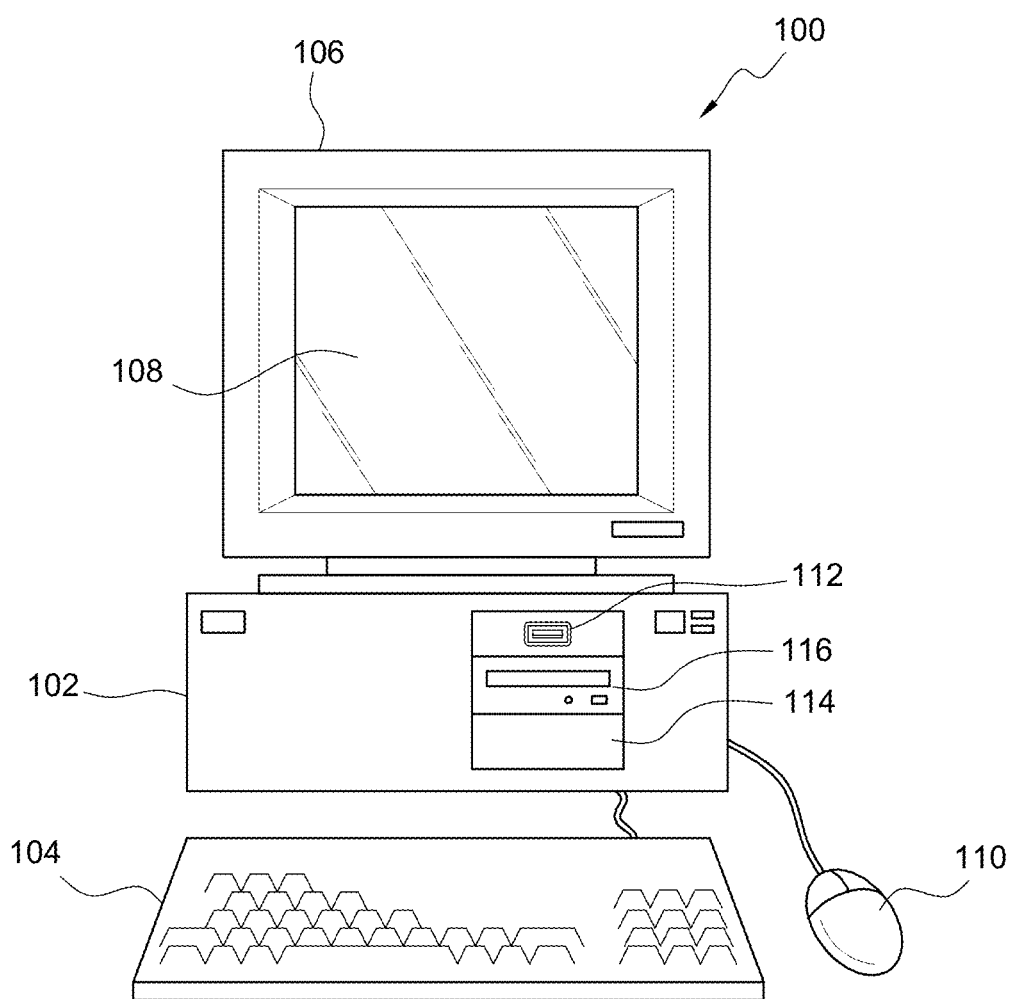
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform acts of receiving a request to generate one or more schedules for one or more drivers; determining one or more respective day cab schedules for each respective day cab driver of the one or more drivers; assigning one or more permanent drivers of the one or more drivers to one or more permanent tractors; assigning at least one driver of one or more remaining drivers of the one or more drivers to at least one tractor using a first set of rules; generating the one or more schedules for the one or more drivers; and coordinating displaying the one or more schedules for the one or more drivers on an electronic device of a user.

Various embodiments include a method. The method can be implemented via execution of computing instructions configured to run at one or more processors and configured to be stored at non-transitory computer-readable media The method can comprise receiving a request to generate one or more schedules for one or more drivers; determining one or more respective day cab schedules for each respective day cab driver of the one or more drivers; assigning one or more permanent drivers of the one or more drivers to one or more permanent tractors; assigning at least one driver of one or more remaining drivers of the one or more drivers to at least one tractor using a first set of rules; generating the one or more schedules for the one or more drivers; and coordinating displaying the one or more schedules for the one or more drivers on an electronic device of a user.

Figure 2:
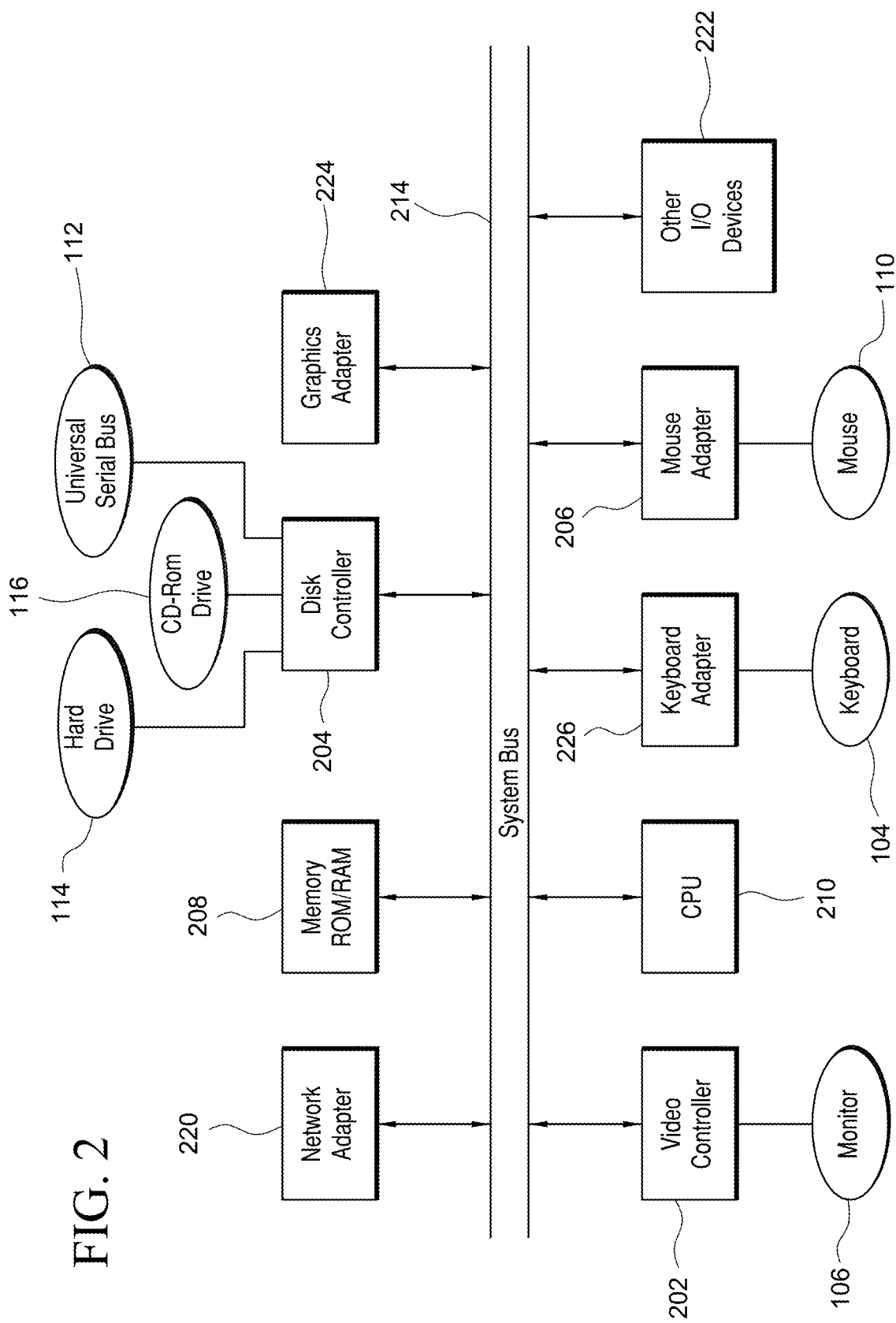
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc.

In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
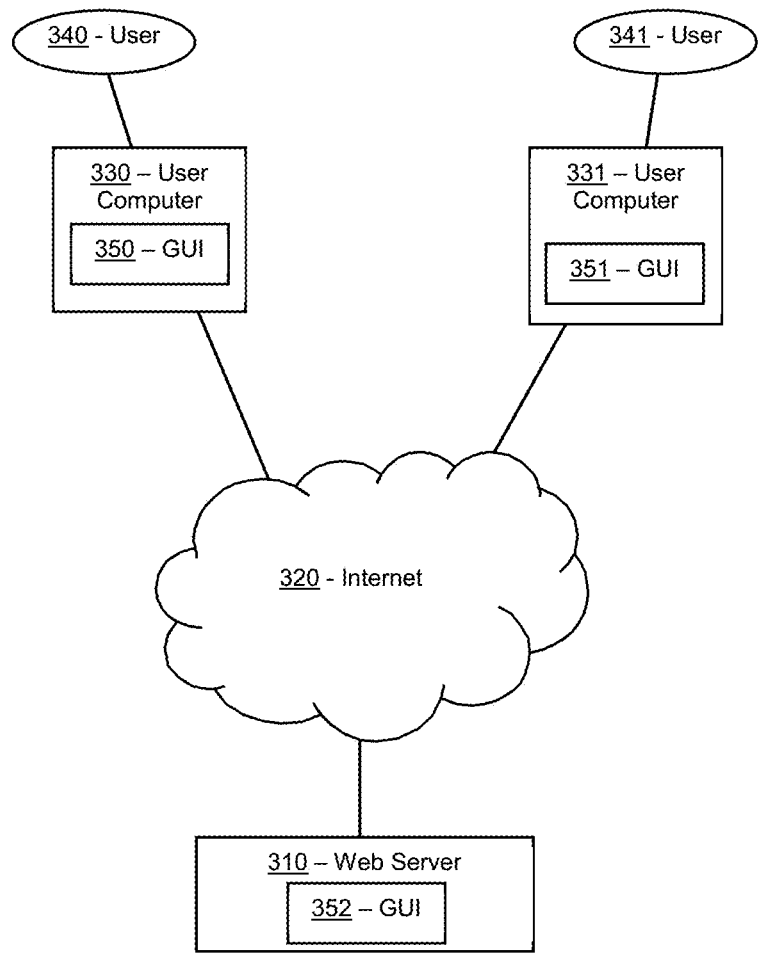
FIG. 3 illustrates a representative block diagram of a system, according to an embodiment.

Turning ahead in the drawings, FIG. 3 illustrates a block diagram of a system 300 that can be employed for scheduling drivers, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310. Web server 310 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310. Additional details regarding web server 310 are described herein.

In many embodiments, system 300 also can comprise user computers 330, 331. In other embodiments, user computers 330, 331 are external to system 300. User computers 330, 331 can comprise any of the elements described in relation to computer system 100. In some embodiments, user computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons. In various embodiments, user computers 330, 331 can comprise a display that is smaller than monitor 106 (FIG. 1), thereby facilitating mobility.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, user computers 330, 331 can comprise vehicle (e.g., car, truck, motorcycle, boat, airplane, bicycle, tricycle etc.) computers. In these or other embodiments, vehicle computers can be coupled to one or more vehicles. For example, vehicle computers can be mounted on a frame of the vehicle and/or be integral with one or more components of the vehicle. In various embodiments, a vehicle computer can comprise a mobile computer that is in data communication (e.g., wired and/or wireless) with a vehicle and/or one or more components of a vehicle. In these or other embodiments, vehicle computers can be configured to run one or more commands on the one or more vehicles. For example, a vehicle computer can be configured to increase or decrease a throttle, engage a break (where available), generate various displays disclosed herein (e.g., GUIs 350-352) on one or more vehicle displays, steer the vehicle, open/close one or more hatches, etc. In some embodiments, the vehicles can be autonomous and/or semi-autonomous.

In many embodiments, system 300 can comprise GUI 350, 351, 352. In the same or different embodiments, GUI 350, 351, 352 can be part of and/or displayed by user computers 330, 331, which also can be part of system 300. In some embodiments, GUI 350, 351, 352 can comprise text and/or graphics (images) based user interfaces. In the same or different embodiments, GUI 350, 351, 352 can comprise a heads-up display ("HUD"). When GUI 350, 351, 352 comprises a HUD, GUI 350, 351, 352 can be projected onto a medium (e.g., glass, plastic, etc.), displayed in midair as a hologram, or displayed on a display (e.g., monitor 106 (FIG. 1)). In various embodiments, GUI 350, 351, 352 can be color, black and white, and/or greyscale. In many embodiments, GUI 350, 351, 352 can comprise an application running on a computer system, such as computer system 100 (FIG. 1), user computers 330, 331, and/or web server 310. In the same or different embodiments, GUI 350, 351, 352 can comprise a website accessed through internet 320. In some embodiments, GUI 350, 351, 352 can comprise an eCommerce website. In these or other embodiments, GUI 352 can comprise an administrative (e.g., back end) GUI allowing an administrator to modify and/or change one or more settings in system 300. In the same or different embodiments, GUI 350, 351, 352 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc. In many embodiments, GUI 350, 351, 352 can comprise one or more GUI elements. In these or other embodiments, a GUI element can comprise a customizable portion of a GUI (e.g., a button, a text entry box, a hyperlink, an image, a text block, etc.). In various embodiments, a GUI element can be selectable by a user 340, 341 and/or interactive.

In some embodiments, web server 310 can be in data communication through Internet 320 with user computers 330, 331. In certain embodiments, user computers 330, 331 can be desktop computers, laptop computers, smart phones, tablet devices, and/or other endpoint devices. Web server 310 can host one or more websites. For example, web server 310 can host an eCommerce website that allows users to browse and/or search for products, to add products to an electronic shopping cart, and/or to purchase products, in addition to other suitable activities.

In many embodiments, web server 310 and user computers 330, 331 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of web server 310 and/or user computers 330, 331 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310 and/or user computers 330, 331. In a similar manner, the processing module(s) and the memory storage module(s) can be local and/or remote to each other.

In many embodiments, web server 310 and/or user computers 330, 331 can be configured to communicate with one another. In various embodiments, web server 310 and/or user computers 330, 331 can communicate or interface (e.g., interact) with each other through a network or internet 320. In these or other embodiments, internet 320 can be an intranet that is not open to the public. In further embodiments, Internet 320 can be a mesh network of individual systems. Accordingly, in many embodiments, web server 310 (and/or the software used by such systems) can refer to a back end of system 300 operated by administrator of system 300, and user computers 330, 331 (and/or the software used by such systems) can refer to a front end of system 300 used by one or more users 340, 341, respectively. In some embodiments, users 340, 341 can also be referred to as drivers, in which case, user computers 330, 331 can be referred to as driver computers. In these or other embodiments, the administrator of system 300 can manage system 300, the processing module(s) of system 300, and/or the memory storage module(s) of system 300 using the input device(s) and/or display device(s) of system 300.

Meanwhile, in many embodiments, web server 310 and/or user computers 330, 331 can also be configured to communicate with one or more databases. In various embodiments, one or more databases can comprise a management database that contains information about drivers, vehicles (i.e. tractors), or routes traveled by the drivers or the vehicles (e.g., availability status, classification, past and future schedules, etc.). In many embodiments, information in the database can be tied to a unique identifier (e.g., an IP address, driver ID, device ID, tractor ID etc.) and/or a user account. In embodiments where a user 340, 341 interacts with GUIs 350, 351 before logging into a user account, data stored in the one or more database that is associated with a unique identifier can be merged with and/or associated with data associated with the user account.

In many embodiments, one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). In some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s). In various embodiments, databases can be stored in a cache (e.g., MegaCache) for immediate retrieval on-demand.

In many embodiments, one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310, user computers 330, 331, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for an improved scheduling system. These techniques described herein can provide a significant improvement over conventional approaches of scheduling drivers, such using an integer programming model. In many embodiments, the techniques described herein can beneficially make determinations based on dynamic information that describes current conditions and/ or conditions that have occurred during the same day a driver is scheduled to operate a tractor. In this way, the techniques described herein can avoid problems with stale and/or outdated schedules by continually updating.

In a number of embodiments, the techniques described herein can advantageously provide an improved ability for an administrator to schedule drivers by allowing an optimization process to be run on a mobile device with reduced screen size and processing power or a smaller portion of a system's cloud computing infrastructure. For example, linear programming optimization logics described herein (e.g., rolling horizon optimization with column generation) provide coarser optimization logics than conventional scheduling systems. For example, using an integer programming model can cause an optimization of schedules to take hours, while a linear programming model can optimize schedules in minutes or seconds. In this way, optimization of large datasets (e.g., updating or re-optimizing a schedule with one or more new drivers) can be completed using minimal computational power and at a reasonable speed (e.g., before a re-optimized schedule becomes obsolete). Further, this reduction in processing time can allow the techniques described herein to be used continuously at a scale that cannot be reasonably performed using the human mind or even prior art optimization techniques. For example, linear programming optimization logics described herein (e.g., rolling horizon optimization with column generation) can consider datasets that are too large and complex to be optimized manually, thereby avoiding a resulting schedule from becoming obsolete before it can be implemented.

Figure 4:
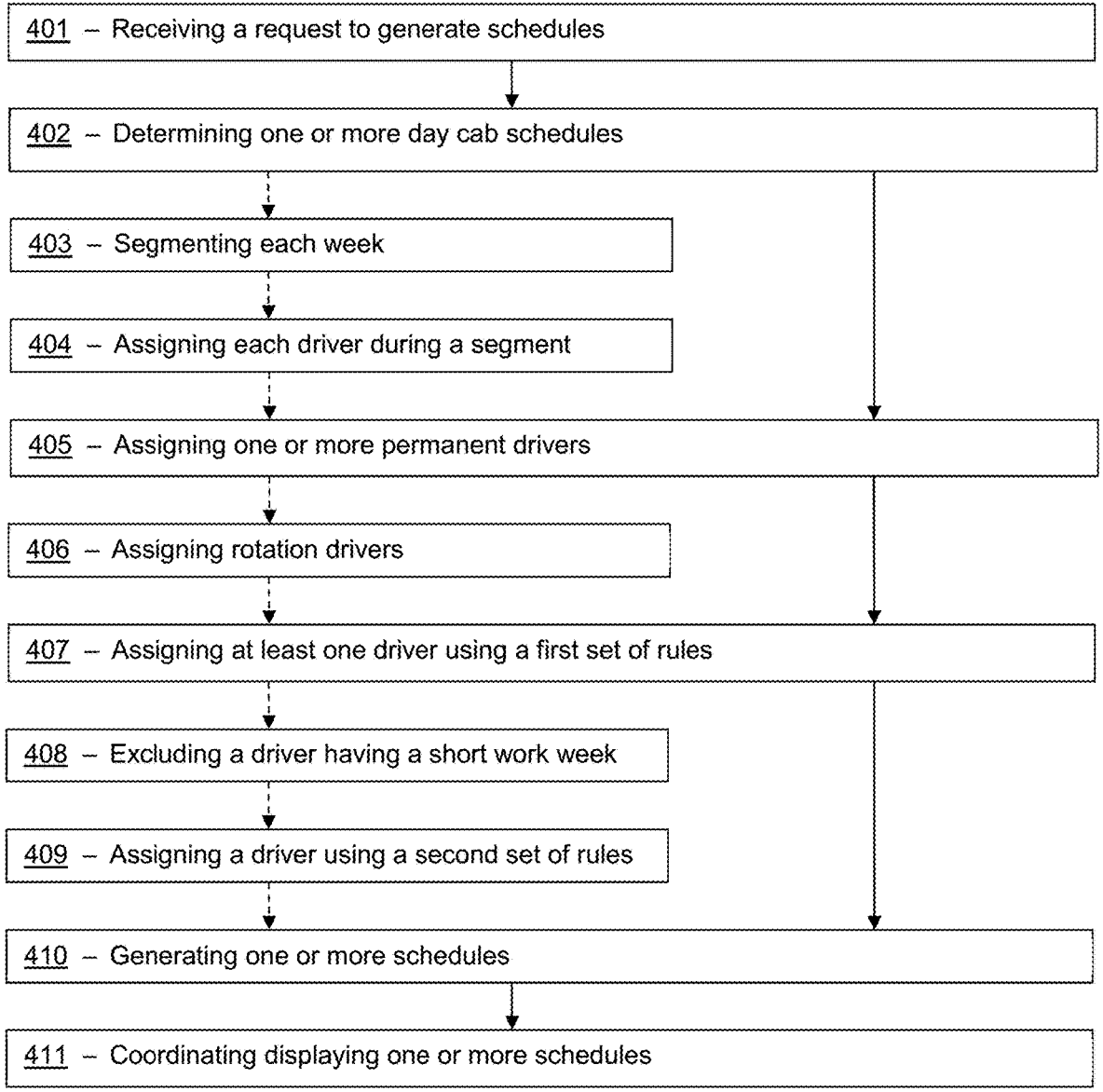
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 (FIG. 3), and/or user computers 330, 331 (FIG. 3). The processing module(s) can be similar or identical to the processing module(s) described above with respect to computer system 100 (FIG. 1).

In many embodiments, method 400 can comprise an activity 401 of receiving a request to generate schedules. A request to generate a schedule can be received from a number of different systems.

In various embodiments, a request can be received from a user device 340, 341 (FIG. 3) (e.g., a driver electronic device and/or a vehicle electronic device as described above). In these embodiments, a request can be entered into a request GUI on the user electronic device. A request GUI can allow a user to make a scheduling request while indicating several constraints on the request. For example, the user can specify a time and/or a date where they are available for scheduling, request past schedules, request specific vehicles, request time off, etc.

In various embodiments, a request can be received from an administrator device (e.g., a device with access to web server 310 (FIG. 3) or web server 310 itself). In some embodiments, a request from an administrator device can be a request for system 300 (FIG. 3) to generate one or more schedules as described herein. In many embodiments, a request from an administrator device can be accompanied by a number of constraints. For example, an administrator can specify which drivers and tractors he wants to schedule, what tractors he wants to schedule, and the type of scheduling algorithm used.

Figure 6:
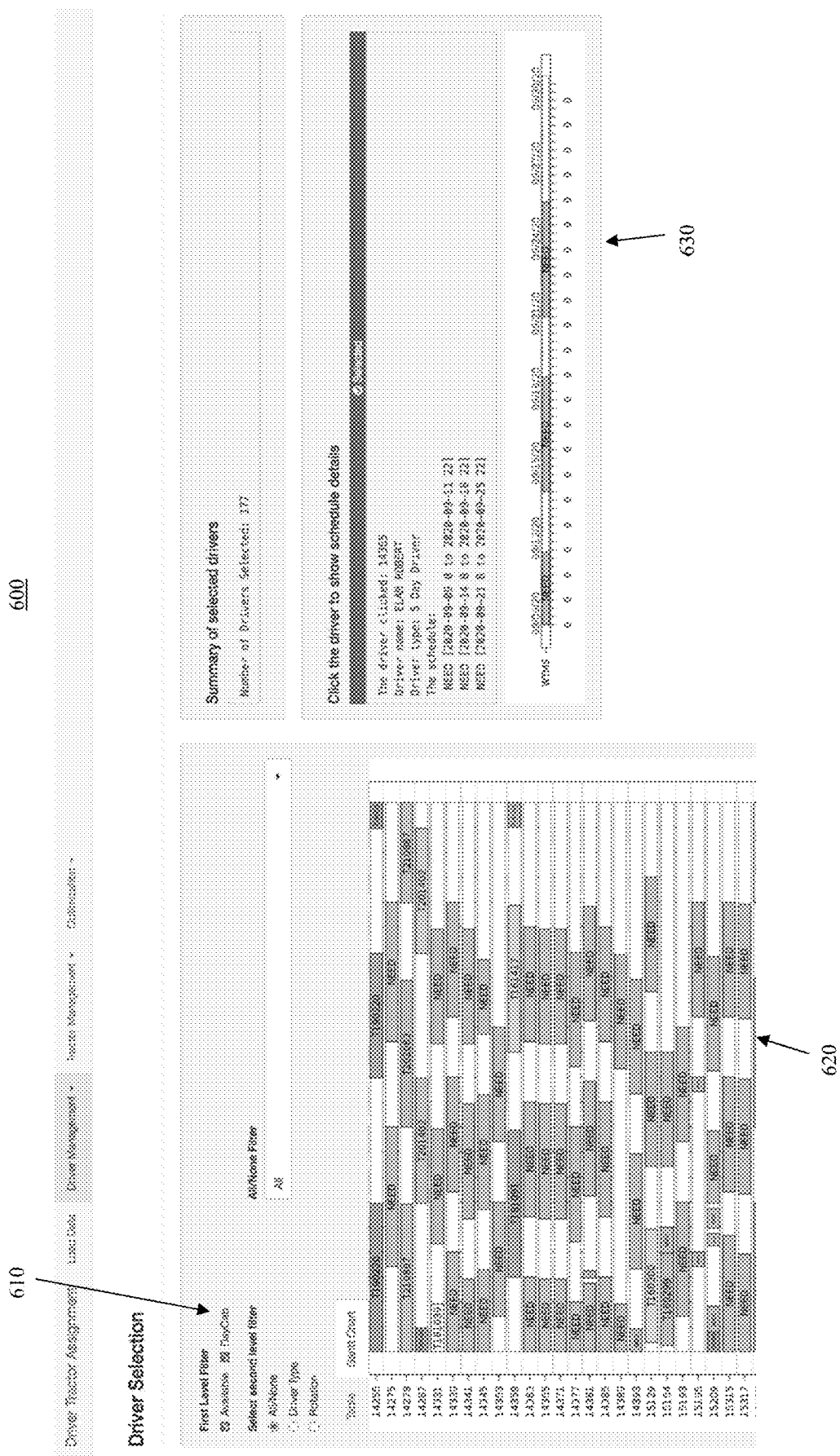
FIGS. 6-8 illustrate representative GUIs according to some embodiments.

Turning ahead in the figures, FIG. 6 shows an exemplary embodiment of a GUI 600 for selecting a driver to schedule. In many embodiments, GUI 600 can comprise filter selector 610, schedule summary 620, and driver details 630. In various embodiments, filter selector 610 can be configured to filter drivers displayed in schedule summary 620 based on various constraints set by an administrator. For example, an administrator can filter by availability, driver classification, driver ID, driver name, etc. In these or other embodiments, two or more filters can be applied via filter selector 610. In some embodiments, schedule summary 620 can show each driver's schedule as a row with a unique driver ID label. In many embodiments, a driver's schedule can comprise one or more selectable portions for each block of availability submitted by the driver via a driver device. Each selectable portion can be labeled to show whether it has been filled or is unfilled (e.g., "NEED"). In embodiments where a selectable portion is filled, a corresponding tractor ID the driver is assigned to can be used to label the selectable portion. Selecting one or more selectable portions can cause various changes in GUI 600.

Figure 8:
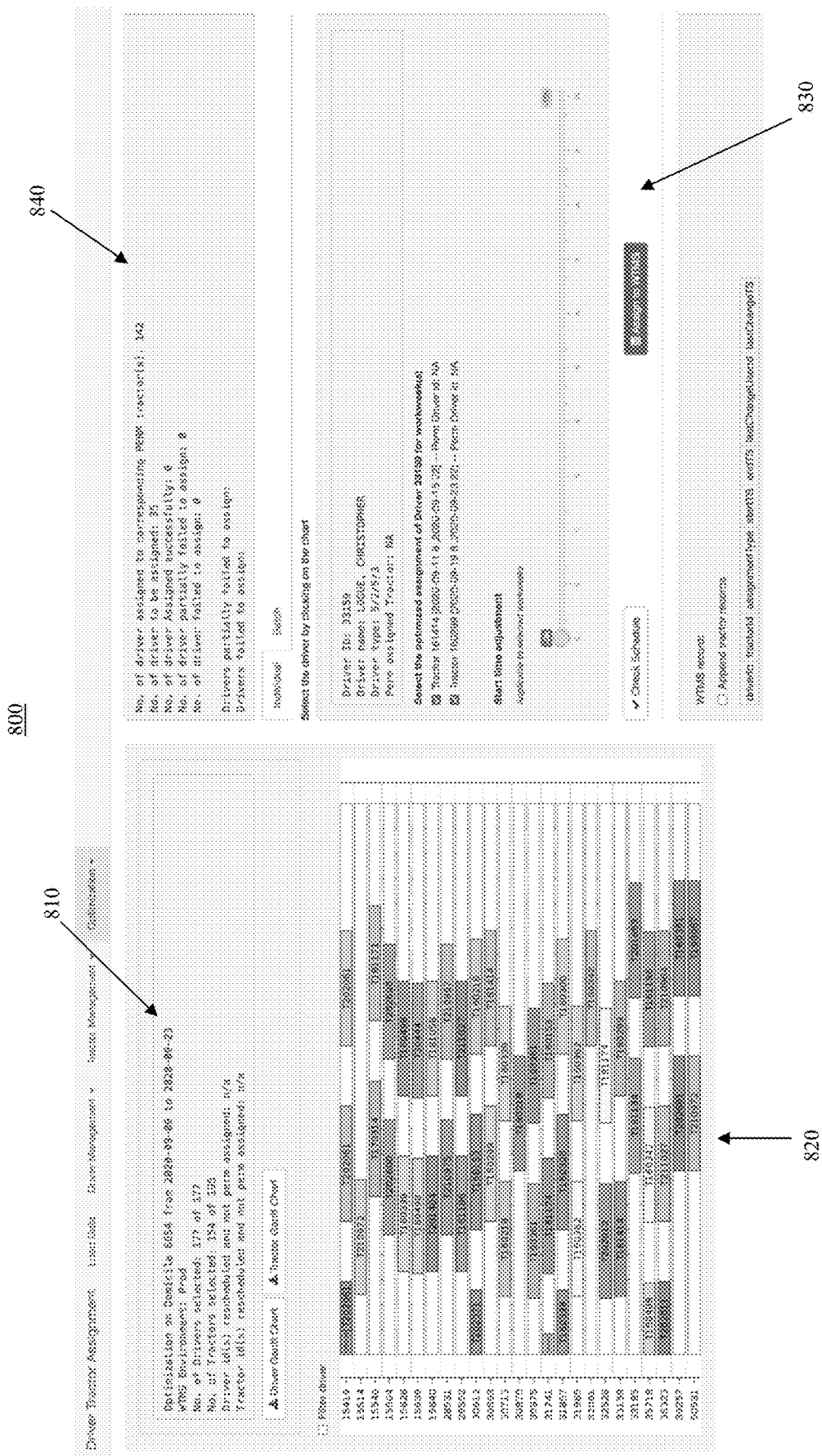

In many embodiments, selecting an unfilled portion of a driver's schedule can add the driver to a list of drivers to be scheduled via GUI 800 (FIG. 8). In these or other embodiments, selecting an unfilled and/or filled portion of a driver's schedule can cause one or more elements of driver details 630 to be displayed. In these embodiments, a counter indicating a number of drivers selected for optimization can be displayed and/or incremented or decremented. In many embodiments, driver details 630 can also display a number of details about a driver. For example, driver details 630 can display the driver's unique ID, the driver's name, the driver's classification, and/or the driver's schedule. In various embodiments, a graphical representation of a driver's schedule can be copied from schedule summary 620 and displayed in driver details 630. A driver's schedule can also be displayed as textual information describing requested times and whether that time is filled or unfilled.

Figure 7:
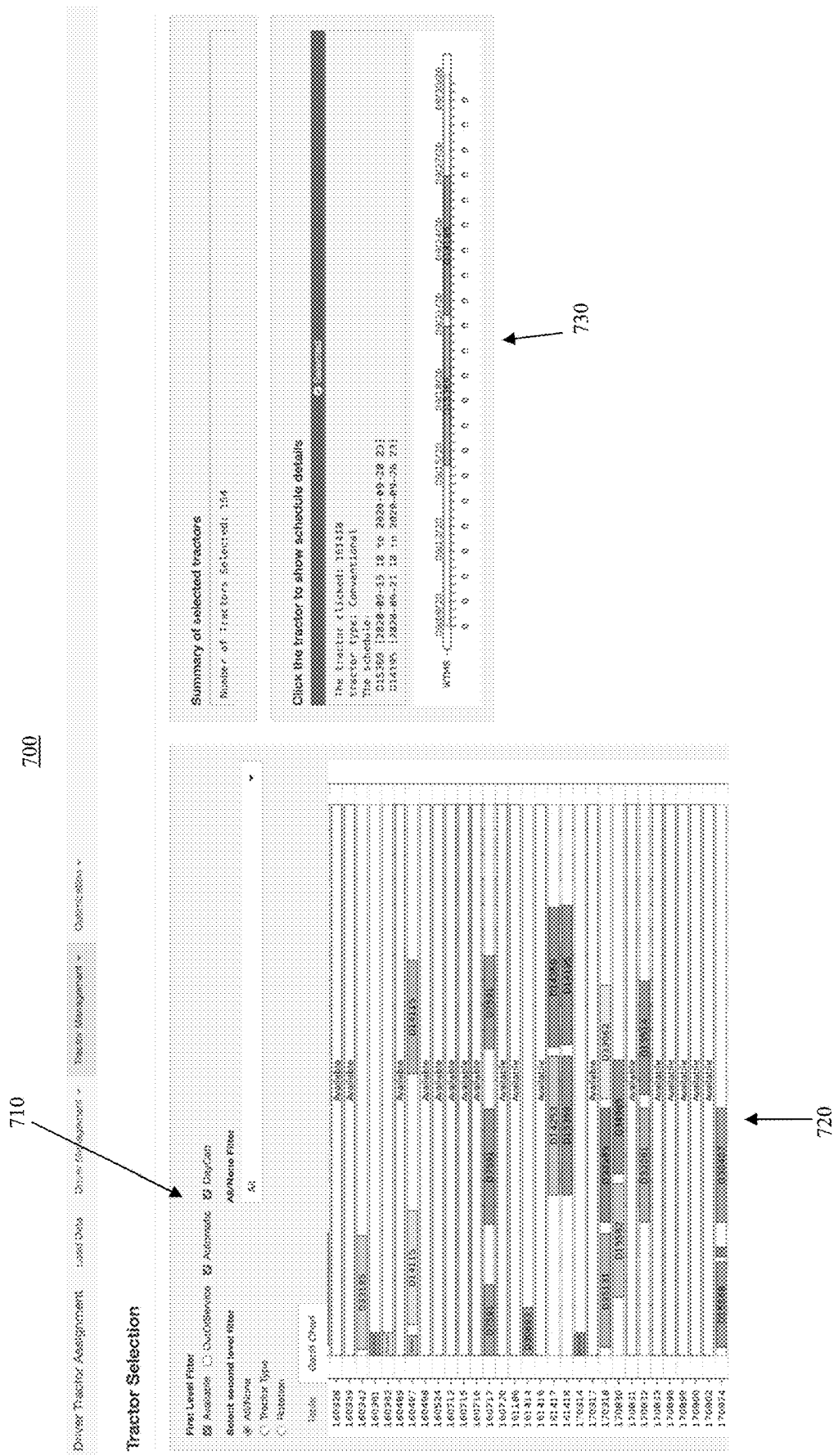

Turning ahead in the figures, FIG. 7 shows an exemplary embodiment of a GUI 700 for selecting a tractor to schedule. In many embodiments, GUI 700 can comprise filter selector 710, schedule summary 720, and tractor details 730. In various embodiments, filter selector 710 can be configured to filter tractors displayed in tractor summary 720 based on various constraints set by an administrator. For example, an administrator can filter by availability, tractor classification, tractor ID, etc. In these or other embodiments, two or more filters can be applied via filter selector 710. In some embodiments, schedule summary 720 can show each tractor's schedule as a row with a unique tractor ID label. In many embodiments, a tractor's schedule can comprise one or more selectable portions for each block of availability for the tractor. Each selectable portion can be labeled to show whether it has been filled or is unfilled (e.g., "Available"). In embodiments where a selectable portion is filled, a corresponding driver ID the tractor is assigned to can be used to label the selectable portion. Selecting one or more selectable portions (either filled or unfilled) can cause various changes in GUI 700.

In many embodiments, selecting an unfilled and/or filled portion of a tractor's schedule can add the tractor to a list of tractors to be scheduled via GUI 800 (FIG. 8). In embodiments where at least a portion of a tractor's schedule has been filled, a subsequent scheduling algorithm can ignore and/or filter out portions of a tractor's schedule with an assigned driver ID. In these or other embodiments, selecting an unfilled and/or filled portion of a tractor's schedule can cause one or more elements of tractor details 730 to be displayed. In these embodiments, a counter indicating a number of tractor selected for optimization can be displayed and/or incremented or decremented. In many embodiments, tractor details 730 can also display a number of details about a tractor. For example, tractor details 730 can display the tractor's unique ID, the tractor's classification, and/or the tractor's schedule. In various embodiments, a graphical representation of a tractor's schedule can be copied from schedule summary 720 and displayed in tractor details 730. A tractor's schedule can also be displayed as textual information describing available times and whether that time is filled or unfilled.

Turning ahead in the figures, FIG. 8 shows an exemplary embodiment of a GUI 800 for initiating schedule generation. In many embodiments, GUI 800 can comprise input summary 810, schedule summary 820, configuration panel 830, and output summary 840. In various embodiments, input summary 810 can be configured to display a summary of the input into the schedule generating algorithm. For example, an input summary can display a domicile being scheduled, dates for the scheduling, a number of drivers selected (e.g., via GUI 600 (FIG. 6)), a number of tractors selected (e.g., via GUI 700 (FIG. 7)), a number of drivers needing to be rescheduled, and/or a number of tractors needing to be rescheduled. In some embodiments, GUI 800 can comprise a filter selector. A filter selector can be configured to, when selected, display a filtering panel similar to filter selector 610 (FIG. 6) and filter selector 710 (FIG. 7). In some embodiments, schedule summary 820 can show each driver's schedule as a row with a unique driver ID label. In various embodiments, schedule summary 820 can show a current iteration of a schedule for one or more drivers and can be updated when a new scheduling process is completed. In many embodiments, a driver's schedule can comprise one or more selectable portions for each scheduled block of availability for the driver. Selecting one or more selectable portions can cause various changes in GUI 800.

In many embodiments, selecting an unfilled portion of a driver's schedule on schedule summary 820 can add the driver to a list of drivers to be scheduled via configuration panel 830. In these or other embodiments, selecting portion of a driver's schedule (either filled or unfilled) can cause one or more elements of schedule summary 810 to be displayed or changed. For example, a counter indicating a number of drivers selected for optimization can be displayed, incremented, or decremented. In many embodiments, selecting a portion of a driver's schedule (either filled or unfilled) can also cause configuration panel 830 to display a number of details about a driver. For example, configuration panel 830 can display the driver's unique ID, the driver's name, the driver's classification, and/or the driver's schedule.

In many embodiments, GUI 800 can comprise a configuration panel 830. In these or other embodiments, configuration panel 830 can be configured to allow an administrator to configure one or more parameters of a schedule optimization algorithm described in activities 402-411 (FIG. 4). For example, configuration panel 830 can allow schedules to be determined for a single driver or as a batch (e.g., for multiple drivers). In some embodiments, a start time adjustment panel can be displayed for one or more drivers. In these embodiments, the start time adjustment panel can be configured to allow availability times for a driver submitted in activity 401 (FIG. 4) to be adjusted by a specific number of hours. For example, a driver may need a set amount of their availability to prepare a specific tractor, attend training at a domicile, speak with an administrator, etc. In many embodiments, configuration panel 830 can display one or more optimized choices to an administrator after an optimization algorithm has begun and/or after the optimization algorithm has finished. For example, if the algorithm determines that two assignments for a driver are approximately equal, then configuration panel 830 can display one or more selectable elements allowing an administrator to make a final assignment. In these or other embodiments, configuration panel 830 can be configured to commit a driver's schedule to a schedule database (e.g., driver management system ("DMS")). For example, when an administrator selects the "Assign to WTMS" button on configuration panel 830, a driver's schedule can be committed to a driver management system.

Returning now to FIG. 4, in many embodiments, method 400 can comprise an activity 402 of determining one or more day cab schedules. In some embodiments, activity 402 can be performed before activities 407-411 so that potentially computationally intense activities (e.g., rolling horizon optimization with or without column generation) can be performed accurately and more efficiently. In various embodiments, one or more day cab schedules can be made for a day cab classification of drivers. In these or other embodiments, a driver can be classified as a day cab driver when the driver has a domicile. For example, a day cab driver's domicile can be the driver's living quarters, a warehouse, jobsite, and/or brick and mortar store. In many embodiments, a day cab driver can be required to return to his domicile at an end of their scheduled period. In various embodiments, one or more day cab schedules can also be made for a day cab classification of tractors. In these or other embodiments, a tractor can be classified as a day cab tractor when the tractor has a domicile. In these or other embodiments, a day cab tractor can be classified as such because it does not have sleeping quarters for a driver. For example, a day cab tractor's domicile can be the a fueling station, a repair station, a warehouse, a jobsite, and/or a brick-and-mortar store. In many embodiments, a day cab tractor can be required to return to its domicile at an end of its scheduled period. In these or other embodiments, a day cab tractor can be marked as such in In some embodiments, method 400 can optionally comprise activity 403 of segmenting each week. In many embodiments, activity 403 can be performed as a part of or at the same time as activities 402 and/or 403. In these or other embodiments, a work week submitted by a day cab driver can be segmented into one or more segments. In these or other embodiments, these one or more segments can be displayed on various GUI's described herein. For example, driver summary 620 (FIG. 6) can be populated, at least in part, with selectable portions representing each of the one or more segments. In some embodiments, one or more segments can be created by removing a driver's domicile times. In these or other embodiments, if a driver is required to be present at the domicile, that time can be marked as a domicile time. In many embodiments, a domicile time can be dynamically determined (e.g., when a maximum number of hours assigned to one or more tractors has been reached for that driver), prescheduled (e.g., requested off time), and/or scheduled periodically into the future (e.g., during recurring off hours).

In some embodiments, method 400 can optionally comprise activity 404 of assigning each driver during a segment. In various embodiments, activity 404 can be performed as a part of or at the same as activities 402 and/or 403. In these or other embodiments, one or more day cab drivers can be assigned to one or more day cab tractors. In many embodiments, a day cab tractor can be identified using one or more marks stored in a management database. In various embodiments, one or more day cab drivers can be assigned to one or more day cab tractors during a segment as created in activity 403. In these or other embodiments, this assignment can be displayed on various GUI's described herein. For example, driver summary 620 (FIG. 6) and tractor summary 720 (FIG. 7) can be populated, at least in part, with selectable portions representing each of the one or more assigned segments. In many embodiments, one or more day cab drivers are left over and still unassigned to a tractor after activity 404 is completed. In these embodiments, any unassigned day cab drivers can be added to a list of driver's to be optimized in activities 407-409 below.

In many embodiments, method 400 can comprise an activity 405 of assigning one or more permanent drivers. In many embodiments, activity 405 can be performed at the same time, after, or before activities 402-404. In some embodiments, activity 405 can be performed before activities 407-411 so that potentially computationally intense activities (e.g., rolling horizon optimization with or without column generation) can be performed accurately and more efficiently. In these or other embodiments, a driver can be classified as a permanent driver when that driver is preferentially assigned to a specific tractor (e.g., a permanent tractor) when the specific tractor is available. For example, a permanent driver may have specialized training for operating a permanent vehicle or may be familiar with the permanent vehicle's operational tendencies. In many embodiments, a permanent vehicle may be unavailable. For example, the permanent vehicle can require repairs or be in use by another driver. In these or other embodiments, a corresponding, unassigned permanent driver can be assigned a tractor using a set of rules as described in further detail below.

In some embodiments, method 400 can optionally comprise activity 406 of assigning rotation drivers. In many embodiments, activity 406 can be performed at the same time, after, or before activities 402-405. In some embodiments, activity 405 can be performed before activities 407-411 so that potentially computationally intense activities (e.g., rolling horizon optimization with or without column generation) can be performed accurately and more efficiently. In these or other embodiments, a driver can be classified as a rotation driver when they are assigned to a group of drivers that share specific tractors (e.g., rotation tractors) over a period of time. For example, drivers can be assigned to a tractor and operate the tractor in shifts (e.g., while another driver sleeps in a tractor or when another driver is not working). In many embodiments, a rotation vehicle may be unavailable. For example, the rotation vehicle can require repairs or be in use by another driver not in the rotation group. In these or other embodiments, a corresponding, unassigned rotation driver can be assigned a tractor using a set of rules as described in further detail below.

In many embodiments, method 400 can comprise an activity 407 of assigning at least one driver using a first set of rules. In various embodiments, unassigned and available drivers remaining after one or more of activities 402-406 can be assigned during activity 407. In these or other embodiments, a first set of rules can comprise a rolling horizon optimization. From a high-level overview, a rolling horizon optimization can be configured to match drivers with tractors starting from a beginning point in time (e.g., when the optimization is requested, or from a specified point in the future) going forward. In many embodiments, a rolling horizon can be considered a strategy of breaking a larger problem into many smaller problems. In this way, each of the smaller problems can be solved more efficiently than the larger problem as a whole. For example, a workweek of a driver can span multiple days, and a rolling horizon optimization can comprise dividing the workweek into a plurality of portions. In this embodiment, a portion can comprise one day. In other words, a rolling horizon optimization can enable to solve a scheduling problem day-by-day. To continue with this non-exclusive embodiment, each of the smaller problems can then solved using a more complex linear programming technique (e.g., column generation).

In many embodiments, a rolling horizon optimization is then repeated at a specified periodicity (e.g., daily). In this way, a rolling horizon optimization can continually optimize a schedule as new data is received due to dynamic conditions. In many embodiments, each problem extracted in the rolling horizon optimization can be solved using column generation. From a high level overview, column generation is an optimization algorithm that splits each identified problems into at least two problems: the master problem and the subproblem. In many embodiments, a master problem can be the original problem with only a subset of variables being considered. In these or other embodiments, a subproblem can a new problem created to identify a new variable that effects an optimal outcome. In some embodiments, an objective function of a subproblem can then be configured to reduce a cost of the new variable with respect to the current dual variables. In many embodiments, each problem identified can be modeled as a pricing problem. For example, every column can correspond to a feasible assignment of a driver's workweek to an available tractor. In this embodiment, column generation can comprise an optimization algorithm that iterates between a master solver and a pricing solver. In many embodiments, a master solver starts with a set of, potentially unoptimized workweek assignments (e.g., columns) and determines a pricing value associated with each driver and tractor. These columns can then be passed to a pricing solver to identify are more optimum workweek assignment. In various embodiments, new assignments found by a pricing solver can represent more efficient (e.g., optimized) columns, and can be added to a master solver. In these embodiments, a master solver can then re-solve an original problem with these newly added and optimized columns. In various embodiments, when a master solver finishes running, pricing value associated with each driver and tractor are updated, and a pricing solver can use these updated values to find more efficient (e.g., more optimum) columns. In many embodiments, an interactive of master solver to pricing solver can performed many times. In these or other embodiments, column generation as described above can continue until no new columns (e.g., more optimum and/or more efficient columns) can be found by a pricing solver.

In many embodiments, column generation can define a column as an assignment of a driver's whole or partial workweek to one or more tractors. In these or other embodiments, column generation can use an objective function comprising:

$$\min \Sigma_{j \in \Omega} c_j x_j$$

In these or other embodiments, $c_j$ can comprise a number of split-seats in a column (e.g., a workweek assignment) and $j \in \Omega$ and $\Omega$ can comprise a set of all feasible assignments of all drivers' workweeks. In various embodiments, a decision variable $x_j$ can comprise a binary variable that equals 1 when column j is selected in the optimal solution and 0 when it is not selected. In these or other embodiments, a split-seat can occur when a workweek is assigned to multiple tractors and a partial workweek assignment is allowed. In these embodiments, an objective of the column generation can be to minimize a total number of split-seats for all drivers' workweeks. In this way, minimizing split-seat can allow a driver to say with the same tractor throughout his workweeks.

In some embodiments, method 400 can optionally comprise activity 408 of excluding a driver having a short work week. In some embodiments, activity 408 can be performed before or at the same time as activity 407. In these or other embodiments, drivers having a short work week can be excluded from a rolling horizon optimization. In this way, a rolling horizon optimization can be completed accurately and more efficiently by avoiding non-standard data inputs (e.g., a driver with a non-standard work week). In many embodiments, a short work week can comprise a driver with less than a five day work week.

In some embodiments, method 400 can optionally comprise activity 409 of assigning a driver using a second set of rules. In many embodiments, activity 409 can be performed before or at the same time as activity 407 and/or 408. In these or other embodiments, a second set of rules can be at least partially different than a first set of rules. In many embodiments, a second set of rules can comprise manual scheduling by an administrator. In this way, drivers with schedules that are non-standard (and therefore poorly adapted for use in a first set of rules) can still be assigned while not slowing down or causing errors in a more advanced optimization algorithm (e.g., rolling horizon optimization with or without column generation).

In many embodiments, method 400 can comprise an activity 410 of generating one or more schedules. In various embodiments, schedules can be generated pursuant to one or more of activities 402-409 as described above. In these or other embodiments, schedules can be generated in a batch and/or individually. In some embodiments, a schedule can be generated using at least a part of a previous schedule. In these embodiments, a previous schedule can be updated (e.g., re-optimized) based on new and/or altered driver availability. For example, one or more drivers can notify an administrator that they are suddenly unavailable or are scheduling vacation time.

In many embodiments, method 400 can comprise an activity 411 of coordinating displaying one or more schedules. In many embodiments, one or more schedules can be displayed on one or more GUIs disclosed herein. For example, GUI 600 (FIG. 6), GUI 700 (FIG. 7), and/or GUI 800 (FIG. 8) can be displayed in activity 411. In many embodiments, a schedule for an individual driver can be displayed on a driver GUI displayed on a driver electronic device (e.g., a request GUI as described in activity 401).

Figure 5:
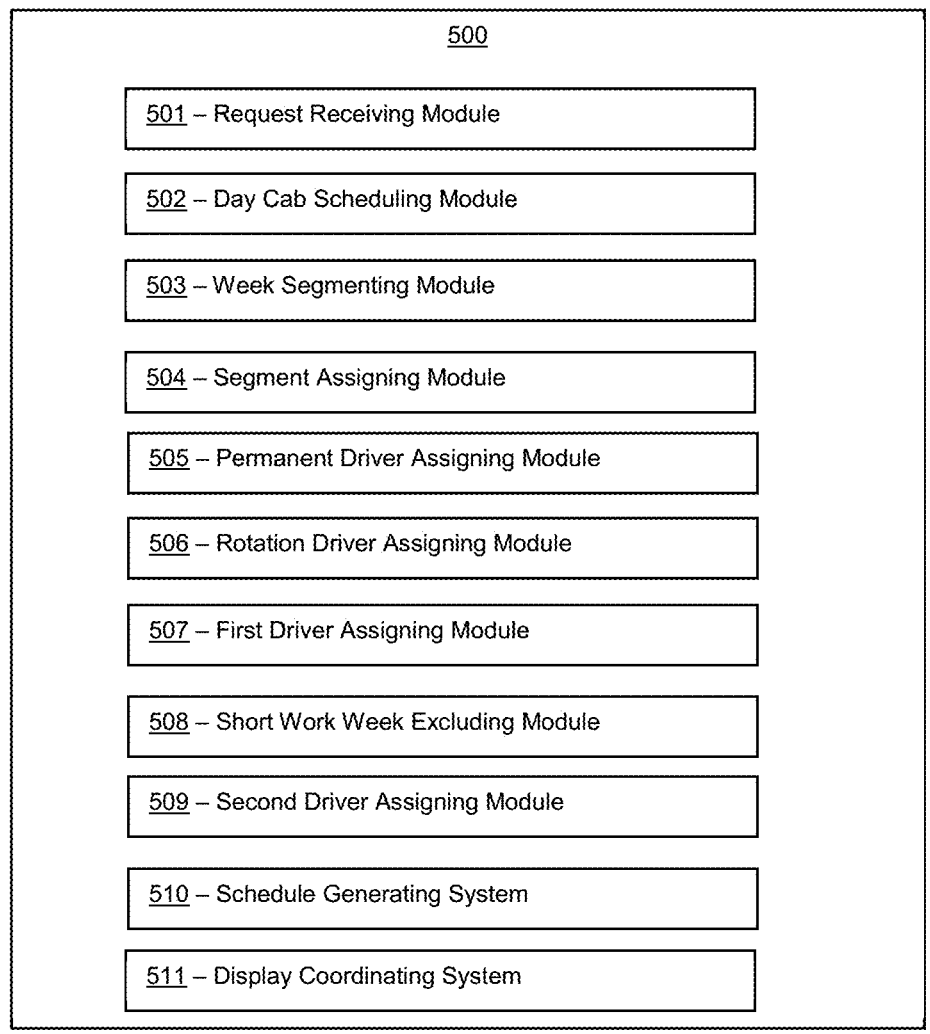
FIG. 5 illustrates a representative block diagram of a portion of the system of FIG. 3, according to an embodiment.

Turning ahead in the drawings, FIG. 5 illustrates a block diagram of a system 500 that can be employed for driver scheduling. System 500 is merely exemplary and embodiments of the system are not limited to the embodiments presented herein. System 500 can be employed in many different embodiments or examples not specifically depicted or described herein. In some embodiments, certain elements or modules of system 500 can perform various procedures, processes, and/or activities. In these or other embodiments, the procedures, processes, and/or activities can be performed by other suitable elements or modules of system 500.

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise non-transitory memory storage module 501. Memory storage module 501 can be referred to as request receiving module 501. In many embodiments, request receiving module 501 can store computing instructions configured to run on one or more processing modules and perform one or more acts of method 400 (FIG. 4) (e.g., activity 401 (FIG. 4)).

In many embodiments, system 500 can comprise non-transitory memory storage module 502. Memory storage module 502 can be referred to as day cab scheduling module 502. In many embodiments, day cab scheduling module 502 can store computing instructions configured to run on one or more processing modules and perform one or more acts of method 400 (FIG. 4) (e.g., activity 402 (FIG. 4)).

In many embodiments, system 500 can comprise non-transitory memory storage module 503. Memory storage module 503 can be referred to as week segmenting module 503. In many embodiments, week segmenting module 503 can store computing instructions configured to run on one or more processing modules and perform one or more acts of method 400 (FIG. 4) (e.g., activity 403 (FIG. 4)).

In many embodiments, system 500 can comprise non-transitory memory storage module 504. Memory storage module 504 can be referred to as segment assigning module 504. In many embodiments, segment assigning module 504 can store computing instructions configured to run on one or more processing modules and perform one or more acts of method 400 (FIG. 4) (e.g., activity 404 (FIG. 4)).

In many embodiments, system 500 can comprise non-transitory memory storage module 505. Memory storage module 505 can be referred to as permanent driver assigning module 505. In many embodiments, permanent driver assigning module 505 can store computing instructions configured to run on one or more processing modules and perform one or more acts of method 400 (FIG. 4) (e.g., activity 405 (FIG. 4)).

In many embodiments, system 500 can comprise non-transitory memory storage module 506. Memory storage module 506 can be referred to as rotation driver assigning module 506. In many embodiments, driver assigning module 506 can store computing instructions configured to run on one or more processing modules and perform one or more acts of method 400 (FIG. 4) (e.g., activity 406 (FIG. 4)).

In many embodiments, system 500 can comprise non-transitory memory storage module 507. Memory storage module 507 can be referred to as first driver assigning module 507. In many embodiments, first driver assigning module 507 can store computing instructions configured to run on one or more processing modules and perform one or more acts of method 400 (FIG. 4) (e.g., activity 407 (FIG. 4)).

In many embodiments, system 500 can comprise non-transitory memory storage module 508. Memory storage module 508 can be referred to as short work week excluding module 508. In many embodiments, short work week excluding module 508 can store computing instructions configured to run on one or more processing modules and perform one or more acts of method 400 (FIG. 4) (e.g., activity 408 (FIG. 4)).

In many embodiments, system 500 can comprise non-transitory memory storage module 509. Memory storage module 509 can be referred to as second driver assigning module 509. In many embodiments, second driver assigning module 509 can store computing instructions configured to run on one or more processing modules and perform one or more acts of method 400 (FIG. 4) (e.g., activity 409 (FIG. 4)).

In many embodiments, system 500 can comprise non-transitory memory storage module 510. Memory storage module 510 can be referred to as schedule generating module 510. In many embodiments, schedule generating module 510 can store computing instructions configured to run on one or more processing modules and perform one or more acts of method 400 (FIG. 4) (e.g., activity 410 (FIG. 4)).

In many embodiments, system 500 can comprise non-transitory memory storage module 511. Memory storage module 511 can be referred to as display coordinating module 511. In many embodiments, display coordinating module 510 can store computing instructions configured to run on one or more processing modules and perform one or more acts of method 400 (FIG. 4) (e.g., activity 411 (FIG. 4)).

Although systems and methods for scheduling drivers have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform functions comprising:
    receiving a request to generate one or more schedules for drivers;
    determining one or more respective day cab schedules for each respective day cab driver of the drivers;
    assigning one or more permanent drivers of the drivers to one or more permanent tractors;
    after assigning the one or more permanent drivers, assigning at least one driver of one or more remaining drivers of the drivers to at least one tractor based on a first set of rules comprising using rolling-horizon optimization with column generation configured to match each one of the one or more remaining drivers with at least one respective tractor within a time period, wherein the rolling-horizon optimization solves problems by breaking down the problems into sub-problems by dividing a time schedule into a plurality of portions;
    excluding, from using the rolling-horizon optimization, a driver of the one or more remaining drivers having a short work week;
    assigning, via a second set of rules, a tractor to the driver of the one or more remaining drivers having the short work week, wherein the second set of rules are different from the first set of rules;
    after a predetermined time interval from assigning the at least one driver of the one or more remaining drivers, iteratively assigning the at least one driver of the one or more remaining drivers to at least one other tractor using the first set of rules, wherein new data is received within the time period, and wherein each problem of the problems is extracted using the rolling-horizon optimization;
    generating a schedule summary displaying one or more selectable portions of each block of availability, wherein the schedule summary comprises the one or more schedules for the drivers, wherein each schedule for each driver of the drivers comprises one or more selectable portions for each block of availability submitted by each driver via a respective driver device, wherein each schedule for each driver of the one or more schedules for the drivers is displayed as a row with a unique driver identification label identifying each driver, and wherein:
        the one or more selectable portions of each block of availability on the schedule summary not scheduled are labeled as unfilled portions; and
        the one or more selectable portions of each block of availability on the schedule summary as scheduled are labeled as filled portions;
    selecting an unfilled portion of each schedule for a respective driver of the drivers adds the respective driver to a list of respective drivers to be scheduled on the schedule summary, wherein each selection causes one or more respective details of the respective driver to be displayed on a graphical user interface (GUI) of an electronic device of a user;
    receiving one or more selections of the one or more selectable portions of each block of availability from the user, wherein each of the one or more selections causes one or more changes to occur on the schedule summary as displayed on the GUI of the electronic device of the user; and coordinating displaying the one or more schedules for the drivers on the electronic device of the user.

2. The system of claim 1, wherein the first set of rules comprises an integer programming model and linear programming optimization.

3. The system of claim 1, wherein the predetermined time interval comprises approximately 24 hours.

4. The system of claim 1, wherein:
the short work week is less than 5 days; and
when a new scheduling process is completed, updating an iteration of the schedule summary as displayed on the GUI of the electronic device of the user.

5. The system of claim 1, wherein:
determining the one or more respective day cab schedules for each respective day cab driver of the drivers comprises:
segmenting each respective work week of each respective day cab driver of the drivers into one or more segments; and
marking one or more day cab vehicles; and
the computing instructions, when executed on the one or more processors, further cause the one or more processors to perform a function comprising:
assigning each respective day cab driver of the drivers to a respective marked day cab vehicle of the one or more day cab vehicles for use during the one or more segments.

6. The system of claim 5, wherein segmenting each respective work week of each respective day cab driver comprises:
creating the one or more segments by removing one or more domicile times.

7. The system of claim 1, wherein the computing instructions, when executed on the one or more processors, further cause the one or more processors to perform functions comprising:
prior to assigning the at least one driver of the one or more remaining drivers of the drivers to the at least one tractor using the first set of rules, assigning each respective rotation driver of one or more rotation drivers of the drivers to one or more rotation tractors; and
when the one or more rotation tractors are unavailable, assigning each respective rotation driver of the one or more rotation drivers of the drivers to the at least one tractor along with the at least one driver of the one or more remaining drivers of the drivers using the first set of rules.

8. The system of claim 1, wherein the first set of rules comprises column generation for each scheduling problem of the problems.

9. The system of claim 1, wherein receiving the request to generate the one or more schedules for the drivers comprises:
receiving from respective driver devices of the drivers, a respective availability of each of the drivers, wherein the respective availability comprises a respective time, a respective date, and one or more respective constraints.

10. The system of claim 1, wherein iteratively assigning the at least one driver of the one or more remaining drivers to the at least one tractor using the first set of rules comprises:
modeling each scheduling problem of one or more scheduling problems as a pricing problem.

11. A method implemented via execution of computing instructions configured to run at one or more processors and configured to be stored at non-transitory computer-readable media, the method comprising:
receiving, via a graphical user interface (GUI) on a first electronic device of a user, a first request to generate one or more schedules for drivers;
determining, via the GUI on the first electronic device of the user, one or more respective day cab schedules for each respective day cab driver of the drivers;
assigning, via the GUI on the first electronic device of the user, one or more permanent drivers of the drivers to one or more permanent tractors;
assigning, via the GUI on the first electronic device of the user, at least one driver of one or more remaining drivers of the drivers to at least one tractor based on a first set of rules comprising using rolling-horizon optimization with column generation configured to match each one of the one or more remaining drivers with at least one tractor within a time period, wherein the rolling-horizon optimization solves problems by breaking down the problems into sub-problems by dividing a time schedule into a plurality of portions;
excluding, from using the rolling-horizon optimization, a driver of the drivers having a short work week;
after assigning the one or more permanent drivers, assigning at least one driver of one or more remaining drivers of the drivers to at least one tractor based on a first set of rules comprising using rolling-horizon optimization with column generation configured to match each one of the one or more remaining drivers with at least one respective tractor within a time period, wherein the rolling-horizon optimization solves problems by breaking down the problems into sub-problems by dividing a time schedule into a plurality of portions;
excluding, from using the rolling-horizon optimization, a driver of the one or more remaining drivers having a short work week;
assigning, via a second set of rules, a tractor to the driver of the one or more remaining drivers having the short work week, wherein the second set of rules are different from the first set of rules;
after a predetermined time interval from assigning the at least one driver of the one or more remaining drivers, iteratively assigning the at least one driver of the one or more remaining drivers to at least one other tractor using the first set of rules, wherein new data is received within the time period, and wherein each problem of the problems is extracted using the rolling-horizon optimization;
generating a schedule summary displaying one or more selectable portions of each block of availability, wherein the schedule summary comprises the one or more schedules for the drivers, wherein each schedule for each driver of the drivers comprises one or more selectable portions for each block of availability submitted by each driver via a respective driver device, wherein each schedule for each driver of the one or more schedules for the drivers is displayed as a row with a unique driver identification label identifying each driver, and wherein:
the one or more selectable portions of each block of availability on the schedule summary not scheduled are labeled as unfilled portions; and
the one or more selectable portions of each block of availability on the schedule summary as scheduled are labeled as filled portions;
selecting an unfilled portion of each schedule for a respective driver of the drivers adds the respective driver to a list of respective drivers to be scheduled on the schedule summary, wherein each selection causes one or more respective details of the respective driver to be displayed on a graphical user interface (GUI) of an electronic device of a user;

receiving one or more selections of the one or more selectable portions of each block of availability from the user, wherein each of the one or more selections causes one or more changes to occur on the schedule summary as displayed on the GUI of the electronic device of the user; and coordinating displaying the one or more schedules for the drivers on the electronic device of the user.

12. The method of claim 11, wherein the first set of rules comprises an integer programming model.

13. The method of claim 11, wherein the predetermined time interval comprises approximately 24 hours.

14. The method of claim 11, wherein:
the short work week is less than 5 days; and
when a new scheduling process is completed, updating an iteration of the schedule summary as displayed on the GUI of the electronic device of the user.

15. The method of claim 11, wherein:
determining the one or more respective day cab schedules for each respective day cab driver of the drivers comprises:
  segmenting each respective work week of each respective day cab driver of the drivers into one or more segments; and
  marking one or more day cab vehicles; and
the method further comprises:
  assigning each respective day cab driver of the drivers to a respective marked day cab vehicle of the one or more day cab vehicles for use during the one or more segments.

16. The method of claim 15, wherein segmenting each respective work week of each respective day cab driver comprises:
creating the one or more segments by removing one or more domicile times.

17. The method of claim 11, further comprising:
prior to assigning the at least one driver of the one or more remaining drivers of the drivers to the at least one tractor using the first set of rules, assigning each respective rotation driver of one or more rotation drivers of the drivers to one or more rotation tractors; and when the one or more rotation tractors are unavailable, assigning each respective rotation driver of the one or more rotation drivers of the drivers to the at least one tractor along with the at least one driver of the one or more remaining drivers of the drivers using the first set of rules.

18. The method of claim 11, wherein the first set of rules comprises column generation for each scheduling problem of the scheduling problems.

19. The method of claim 11, wherein receiving the request to generate the one or more schedules for the drivers comprises:
receiving from respective driver devices of the drivers, a respective availability of each of the drivers, wherein the respective availability comprises a respective time, a respective date, and one or more respective constraints.

20. The method of claim 11, wherein iteratively assigning the at least one driver of the one or more remaining drivers to the at least one tractor using the first set of rules comprises:
modeling each scheduling problem of one or more scheduling problems as a pricing problem.

* * * * *